Jan. 17, 1967   F. J. ACTON   3,298,495
INCLINED MOVING WALKWAY ARRANGEMENT
Original Filed Dec. 7, 1962   3 Sheets-Sheet 1
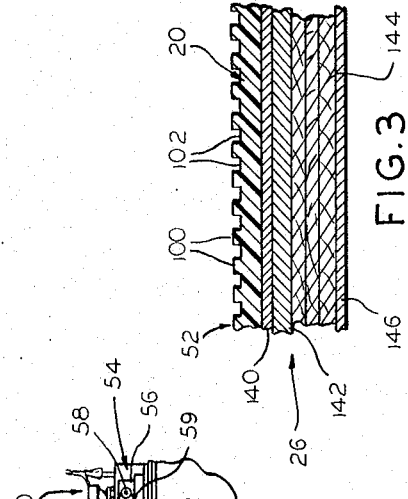
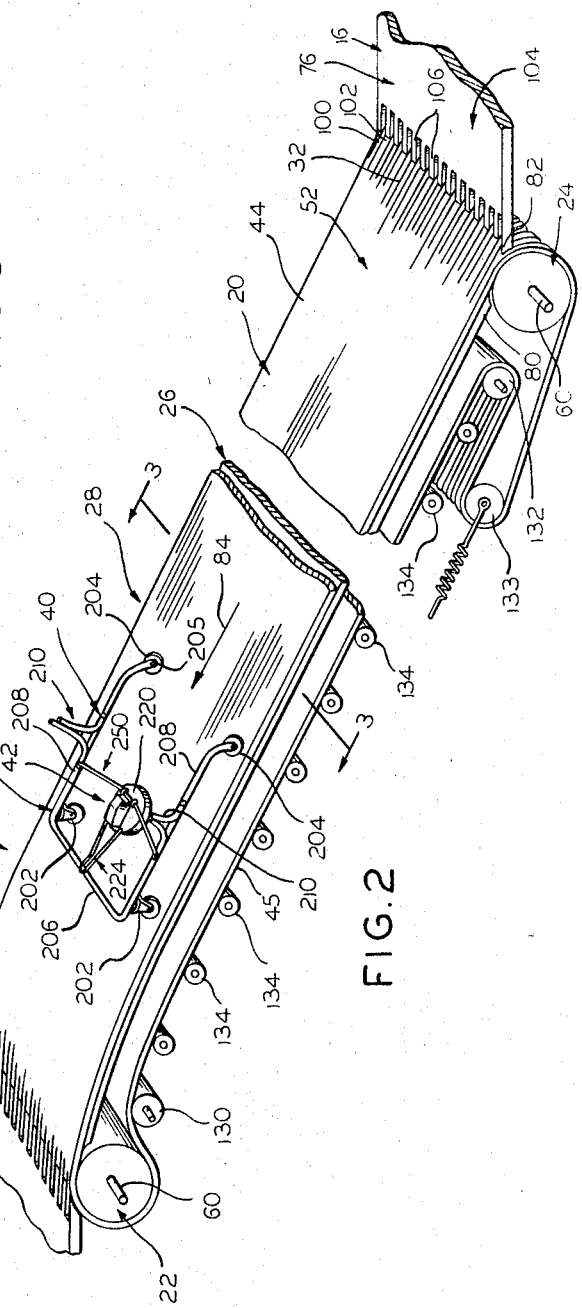
INVENTOR.
FRANK J. ACTON
BY
Mann, Brown & McWilliams
ATTORNEYS Jan. 17, 1967   F. J. ACTON   3,298,495
INCLINED MOVING WALKWAY ARRANGEMENT
Original Filed Dec. 7, 1962   3 Sheets-Sheet 2
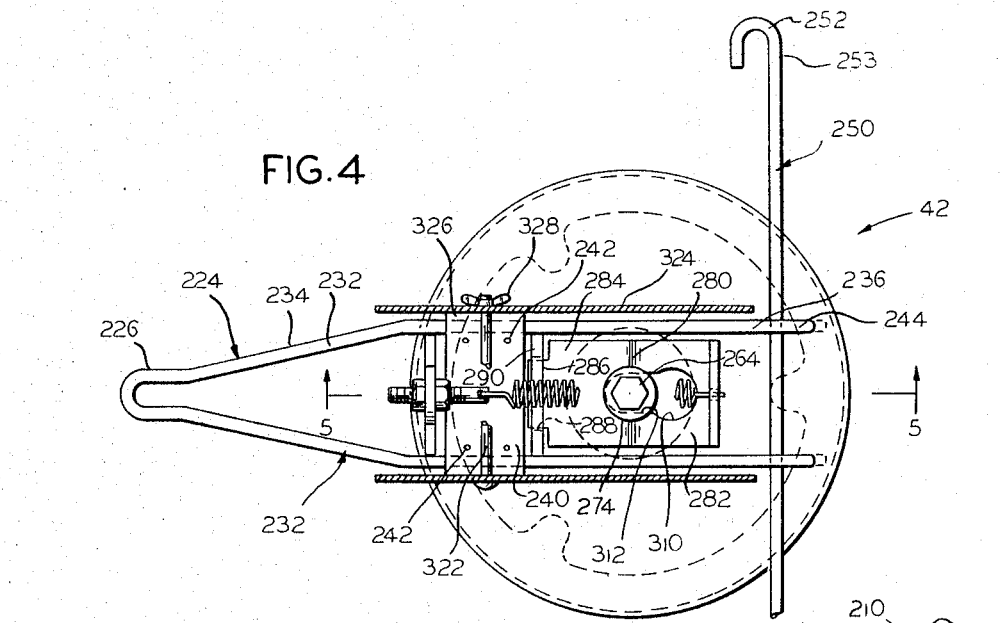
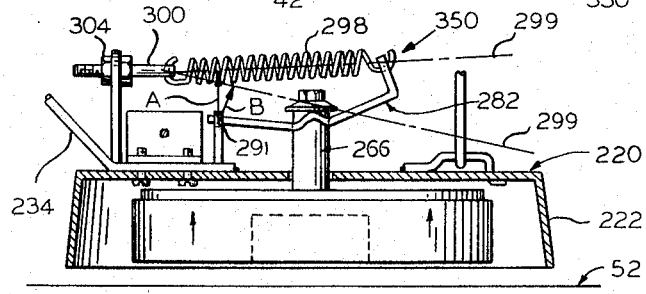
INVENTOR.
FRANK J. ACTON
BY
Mann, Brown & McWilliams
ATTORNEYS INVENTOR.
FRANK J. ACTON
BY
Mann, Brown & McWilliams
ATTORNEYS

United States Patent Office

3,298,495
Patented Jan. 17, 1967

3,298,495
INCLINED MOVING WALKWAY ARRANGEMENT
Frank J. Acton, Glen Ellyn, Ill., assignor to Stephens-Adamson Mfg. Co., a corporation of Illinois
Continuation of application Ser. No. 243,049, Dec. 7, 1962. This application Mar. 4, 1966, Ser. No. 540,124
20 Claims. (Cl. 198—16)

This application is a continuation of my now abandoned copending application Serial No. 243,049, filed December 7, 1962.

My invention relates to moving walkways or sidewalks, and more particularly, to an inclined moving walkway arrangement that is specifically adapted for ready and safe transportation of shoppers and their shopping or parcel carts between floors of multi-floor or level shopping centers and the like.

The modern trend toward mass merchandising techniques has come to call for the use of multi-story marketing facilities operated on the supermarket principle, which involves the use of shopping carts on a self-service basis and check-out counters at the building exit.

As the basic idea is to make it as easy as possible for shoppers to see as much as possible in the store, it necessarily follows that customer movement between floor levels must be quick, convenient, and susceptible of use at any desired time, in addition to being safe and dependable.

Moreover, as supermarket type operation calls for the use of shopping carts, this introduces a complicating factor insofar as multi-story units are concerned as efficient customer handling requires that the shopper be able to freely move his shopping cart to any desired part of the store. Thus, the conventional vertically movable elevators have a much too limited capacity to accommodate shopping carts as well as passengers, and escalators or moving stairways are obviously not adapted for handling shopping carts.

Consequently, it has been proposed to use inclined moving walkways of the moving sidewalk type to serve as a mass transportation type system for handling both shoppers and their carts.

However, the fact that the walkways are inclined means that the individual carts, when taken onto the walkway by the shopper, will tend to "run down hill" under the action of gravity. If the shopper should inadvertently let go of even a lightly loaded cart, the cart would immediately start to roll toward the lower end of a walkway, with obviously dangerous potentialities.

While the moving walkway principle appears to provide the optimum solution for promoting the free movement of shoppers between floor levels, the problem of carts rolling down the walkway has heretofore confined the use of inclined walkways to situations in which shopper's carts and the like are not involved.

Numerous attempts have been made to overcome this cart rolling problem, but insofar as I am aware, none of them have been found practical for the reason that they will not function on the 100% effective basis that is required for facilities used by the public.

For example, one proposed solution involved the use of a mechanical device for locking the cart wheels against movement when the cart was placed on the walkway. Use of this approach required that each cart in the building be appropriately equipped with a braking device that would automatically and consistently function to lock the cart wheels as soon as the cart was pushed onto the moving element of the walkway, and when the other end of the walkway was reached, the braking device would have to operate just as automatically and consistently to release the cart wheels so that the shopper would be free to move himself and his cart out of the way of others immediately following him. It was found that mechanical devices in general would not operate consistently enough to warrant their adoption for this purpose.

A principal object of my invention is to provide a foolproof arrangement for securing shopping carts against rolling movement down inclined moving walkways which operates with the consistency required for safely handling the public.

A further principal object in my invention is to provide a magnetic inclined walkway arrangement that safely handles shopping carts with the consistency and effectiveness required for mass transportation systems.

Another object of the invention is to provide a novel system and method for safely and effectively transporting shoppers and their carts between different floor levels.

Still further objects of the invention are to provide simplified passenger belt conveyor apparatus, to provide a magnet device for application to shopping carts and the like for use in connection with my system, to provide an improved shopping cart arrangement for use in connection with my system, and to provide a conveyor apparatus that is economical of manufacture, convenient to install, and efficient in use.

Other objects, uses and advantages will become obvious or be apparent from a consideration of the following detailed description and the application drawings.

In the drawings:

FIGURE 1 is a small scale side elevational view of one walkway of a pair of walkways arranged in accordance with this invention, as the walkway might appear in the stairwell of a building or the like that is provided for accommodating the walkways;

FIGURE 2 is a diagrammatic perspective view of the other walkway, illustrating diagrammatically the basic components thereof, and showing the base of a shopping cart and the position it would take as it is moved upwardly by the walkway;

FIGURE 3 is a fragmental, diagrammatic cross-sectional view substantially along line 3—3 of FIGURE 2, illustrating the structural features of the walkway belt and slider bed that are shown diagrammatically in FIGURE 2;

FIGURE 4 is a plan view of a magnet device that is employed in association with the shopping carts shown in FIGURES 1 and 2 in accordance with this invention;

FIGURE 5 is a diagrammatical cross-sectional view substantially along line 5—5 of FIGURE 4, but showing in outline form some of the associated components of an associated shopping cart and indicating the extended, operative position of the magnet device;

FIGURE 6 is a view similar to that of FIGURE 5, but showing the magnet device in its withdrawn or inoperative position.

Figure 7:
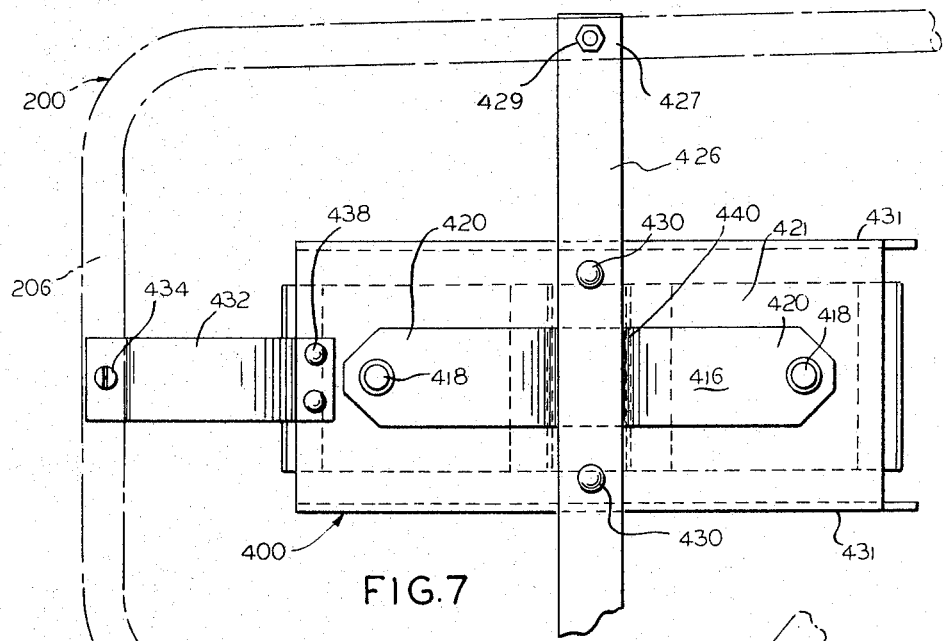
FIGURES 7-9 correspond to FIGURES 4-6, but illustrate a modified form of magnet device that is adapted for use in association with the shopping carts of FIGURES 1 and 2.

It should be understood, however, that the specific drawing illustrations provided are supplied primarily for purposes of complying with 35 U.S.C. 112, and that the invention is susceptible of many other specific embodiments. Consequently, the appended claims are to be interpreted as broadly as relevant prior art will permit.

*General description*

Referring now more specifically to FIGURES 1 and 2, reference numerals 10 and 12 generally indicate a pair of moving walkways that are employed for the purpose of conveying shoppers and their carts between an upper floor 14 and a lower floor 16, that are intended to represent adjacent floor levels of one of the familiar multi-story unit shopping center buildings.

As indicated in these figures, moving walkway 10 conveys the passengers downwardly from the level of upper floor 14 to the level of lower floor 16, while moving walkway 12 carries the shoppers and their carts upwardly from a lower floor 16 to the upper floor 14.

The moving walkways 10 and 12 may be conveniently mounted adjacent each other in the building stairwell or the like that is provided for this purpose, similar to the practice now commonly employed in connection with escalator installations, and under ordinary circumstances, it may be assumed that there are like sets of walkways 10 and 12 above and below the set illustrated, with each set being provided as required to transport shoppers and their carts between adjacent floor levels of the building.

It may be mentioned that under ordinary circumstances, the walkway 12 would be mounted laterally in front of, or to the rear of, the showing of walkway 10 in FIGURE 1, and that their paths of movement would in effect "cross" in much the same manner as is now commonly found in connection with escalator installations.

The moving walkways 10 and 12 are identical in construction, although they are illustrated moving in reverse directions insofar as this disclosure is concerned.

Referring to FIGURE 2, in accordance with this invention, the walkways both comprise an endless ribbon belt 20 trained over end pulleys 22 and 24 and cooperating with a slider bed or plate structure 26 that is shaped to define the walkway configuration illustrated.

The moving portion of the walkway arrangement contemplated by this invention preferably is arranged to define an inclined portion 28 and level or generally horizontal upper end portion 30 which are connected by convexly curved portion 34.

My invention further contemplates the use of shopping carts 40, each of which is equipped with a brake member in the form of a magnet device generally indicated at 42 in FIGURE 2 that is especially adapted for cooperation with the slider bed or plate 26. In accordance with the illustrated embodiment of this invention, the slider bed or plate 26 is formed from or includes magnetic material, such as a suitable sheet steel, and in addition to supporting the upper run 44 of the belt 20, serves to make fast to the belt against the action of gravity the individual carts 40 so that these carts may be safely conveyed by walkways 10 and 12.

As indicated in FIGURE 2, the slider bed or plate 26 preferably extends substantially the full distance between the end pulleys 22 and 24, and it preferably is shaped to define the level, curved, and inclined portions of the conveyor that have been previously mentioned.

Each magnet device 42 includes a flat bottomed permanent magnet, such as the magnet indicated at 50 in FIGURE 5, which is movable from a position in which it engages the belt transport surface 52 to a position where it is spaced a short distance above the surface so as to avoid interference with carpeting and the like that might be encountered on the floors of the shopping unit.

The walkways 10 and 12, and in particular belts 20, are operated in accordance with the instant disclosure by driving upper end pulleys 22 with a drive 54 of the type generally suggested by FIGURE 1, which may include a suitable motor 56 for driving sprocket 58 that is coupled to pulley 22 in any suitable manner (not shown). In the specific conveyor apparatus illustrated, it may be assumed that the pulleys 22 and 24 are of the live shaft type and have their surface shafts 60 journaled in suitable bearings (not shown) for rotation in the manner indicated.

The motor 56 for each walkway is preferably incorporated in an integrated control system of any suitable type so that the walkways 10 and 12 may be selectively driven either upwardly or downwardly at the option of the operator.

Adjacent each end of the walkways 10 and 12, platforms 74 and 76 are provided to connect the conveyor ends with the adjacent floor structure, though it should be understood that they may be formed by extensions of such floor structure. In the case of the conveyor or walkway 12, the upper platform 74 is the landing platform and the lower platform 76 is the take-off platform, while in the walkway of FIGURE 1, this function of a platform is reversed.

In operation, normally the walkways 10 and 12 would operate continuously throughout the period that shoppers would be in the store. As previously indicated, walkway 10 will convey shoppers and their carts from the upper floor 14 to the lower floor 16, while walkway 12 will convey shoppers and their carts in a reverse direction.

Shoppers coming into the store will select a shopping cart 40 in a manner customary to supermarket type operations, and then move about as desired to see the goods the customer is interested in. If it is desired to move from the lower floor 16 to the upper floor 14, the shopper moves his cart to the base or lower portion of a walkway 12, that is to the platform 76, and then pushes his cart directly onto the lower end portion 32 of the walkway, with the shopper following right onto the walkway. As soon as the magnet device 42 comes into the proximity of the slider bed or plate 26, the magnet 50 is drawn into contact with the surface 52 of the belt, and in accordance with this invention, the magnetic strength of the magnet 50 is made such that this will occur as soon as the magnet 50 is disposed adjacent the lower end 80 of the slider bed or plate 26. If the conveyor end pulleys are made from a magnetic material, such as steel (as is usually the case), the magnet 50 will drop into engagement with the belt surface as soon as it passes over the edge 82 of landing 76, and this is the preferred arrangement.

The upper run 44 of the belt 20 moves in the direction indicated by the arrow 84 of FIGURE 2 and in so doing conveys the shopper and his cart 40 up the inclined conveyor portion 28, over the curved portion 34, and thence across the level conveyor portion 30 for discharging onto the upper landing 74.

As the cart 40 proceeds up the inclined conveyor portion 28, the normal tendency of gravity to make the cart 40 roll downwardly of the walkway 12 will be overcome by the magnetic attraction of the magnet device 42 to the slider bed or plate 26. The end result is that the magnet 50 is sufficiently attracted to the slider bed 26 that the magnet 50 is frictionally held against movement with respect to the belt 20, and, of course, the magnetic strength of magnet 50 should be selected as such that the frictional hold on magnet 50 will obtain in spite of the largest load that could be placed in the individual carts 40.

At the upper end of the walkway 12, the belt 20 in moving in the direction of the arrow 84 discharges the cart and shopper smoothly onto the landing 74 and as the belt 20 moves away from magnet 50 and around roller 22, the frictional engagement between the magnet 50 and the belt 20 is broken for easy and automatic release of the cart onto the platform 74. The magnet 50 of the cart then automatically retracts inside of the magnet device 42, and the cart 40 may be freely moved about floor level 14 in the usual manner.

The walkway 10 is operated in similar manner, except that the passengers approach it from the upper floor level 14 for transportation down to the lower floor 16.

It will therefore be seen that I have provided an inclined magnetic conveyor or walkway arrangement for safely and efficiently handling shoppers and their carts with the 100% effectiveness that is required for mass transportation purposes. The system is entirely automatic, and is readily negotiated by anyone capable of using a shopping cart.

*Specific description*

The specific features of the conveyor belt and drive for walkways 10 and 12 that are illustrated are largely optional, though those illustrated have been incorporated in a highly successful commercial embodiment of the invention and are preferred.

Conveyor belt 20 preferably is of the type that has its transport surface 52 formed with a plurality of closely spaced, longitudinally extending, and alternating ridges 100 and grooves 102, and the ends of the landings 74 and 76 are in the form of a comb plate structure 104 which includes fingers 106 that ride within the belt grooves 102 for purposes of insuring that pieces of clothing and the like are not carried around the pulley at the unloading end of the coveyor. The showing of ridges 100 and grooves 102 of FIGURES 2 and 3 is somewhat out of proportion for ease of illustration, but it should be understood that the ridges and grooves of conventional belting of this type are proportioned to readily support the narrowest of heels for women's shoes (grooves 102 are 3/16 of an inch in width in an operating embodiment of this invention).

The pulleys 22 and 24 as well as the slider bed or plate 26 may be appropriately supported in a suitable framework which is diagrammatically indicated at 110 in FIGURE 1, and it may be assumed that the walkway 12 is similarly arranged. The inclined portion 28 of both walkways may have an inclination with respect to the horizontal up to about 15 degrees. The lower run 45 of belt 20 engages bend pulleys 130 and 132 as well as tensioning pulley 133, in a more or less conventional belt training manner. Lower belt run 45 may ride on suitable idlers 134 between bend pulleys 130, and the pulleys 130, 132, 133 and idlers 134 may be mounted and supported in any suitable manner.

Slider bed or plate 26 of the illustrated embodiment may take the form of a single sheet of magnetic material (such as a suitable steel) provided with the indicated configuration, but FIGURE 3 has been provided to illustrate a preferred composite bed on plate arrangement which comprises a top wear resisting sheet 140 of stainless steel (1/16 of an inch thick) against which belt 20 engages, a magnetic sheet 142 of cold rolled steel (1/4 inch thick), a plywood layer 144 and a zinc coated steel backing sheet 146 (1/16 inch in thickness) all fixed together in any suitable manner to provide a rigid unitary structure.

As indicated in FIGURE 1, the walkways may be provided with an appropriate hand rail structure, generally indicated at 192, which may include a moving hand rail 194 operated at any convenient and conventional manner to move at the same speed that the conveyor belt 20 moves. Ordinarily, there would be such a hand rail unit structure on either side of the walks, but this has been omitted from the drawings to avoid prolexity.

The structural arrangement of the shopping carts 40 is largely optional except that the carts must be designed to carry the magnet devices 42 for operation in accordance with the basic principles of my invention.

In the form illustrated, the carts 40 comprise a U-shaped lower frame member 200 (see FIGURE 2) provided with casters 202 at its forward end (mounted for swinging movement about a ball bearing structure indicated at 203 in FIGURE 5) and appropriate wheels 204 at its rearward end journaled in place by appropriate pins 205. The U-shaped member 200 thus defines a forwardly disposed web portion 206 and rearwardly extending legs 208 (with wheels 204 being secured at the rear ends of the latter), and in the illustrated arrangement, a suitable bracing structure generally indicated at 210 and carried by each leg portion 208 supports the cart basket or tray 212 in any appropriate and conventional manner.

The carts 40 may be provided with the usual and customary push handle, which is shown diagrammatically at 214 in FIGURE 1, and this is what the customer or shopper ordinarily grasps to move the cart around the store.

The magnet device of FIGURES 4–6 is preferred for use in connection with the carts 40, and this is the form of magnet device that is shown in FIGURE 2.

The magnet 42 in addition to the magnet 50 comprises a magnet cover 220 that includes a skirt portion 222 for screening the magnet. The cover 220 is supported from the cart by a generally U-shaped support member 224 formed with a bight 226 that is secured to the web portion 206 of frame member 200 by being received over an appropriate bolt 228 and held in place by a nut 230. The support member 224 includes leg portions 232 comprising downwardly angled segments 234 that merge into segments 236 which are secured in place against the top of cover 220 by a four sided bracket 240 held in place by appropriate screws or bolts 242. The extreme end portions of segments 236 are indented as at 244 and then formed as at 246 to pass through locating holes 248 in the top of the cover 20 so that the segments 236 of member 224 will seat readily and properly against the top of the cover 220 when the device 42 is assembled.

The cover 220 is also supported by the transversely extending support member 250, which passes under the indented portions 244 of support member 224, and has its ends 252 looped and angled as at 253 to be received over bolts 254 that are carried by the frame member 200, with these end portions 252 being secured in place by appropriate nuts 256.

In this particular magnet device, the magnet 50 is carried by the cover member 220 through a substantially constant force combination leverage and spring suspension system that retracts the magnet 50 within cover 220 when the cart 40 carrying same is not in operative relation with the walkways.

The magnet 50 generally comprises an annular element 260, which may take the form of an annulus of barium ferrite ceramic material of a commercially available type, which is associated with a supporting disc 262; these elements in accordance with the present invention are secured together by a cover element 264 in the form of a sheet of suitable plastic material that is vacuum drawn against the assembled magnet element 260 and the disc 262. Cover element 264 keeps the magnet together even if it should fracture in service.

The magnet 50 carires a post 266 which is in the form of a sleeve 268 secured to disc 262 by bolt 264 applied to threaded hole 265 in disc 262. Applied between the head 270 of bolt 264 and the upper end 272 of sleeve 268 is a lock washer 274, which engages the fulcrum portion 280 of a rocking lever 282 that has one of its ends 284 reduced as at 286 for reception in opening 288 in a wall or flange 290 of bracket 240 to serve as the pivot point 291 of the lever 282.

The other end 292 of lever 282 is angled as at 294 and is provided with a suitable opening 296 to receive one end of a tension spring 298 that has its other end secured in the opening 299 of adjustment screw 300 that is adjustably received in a wall or flange 302 of bracket plate 240 and held in place by the spaced adjustment nuts 304.

As indicated in FIGURE 4, the lever 282 is formed with an opening 310 proportioned to receive washer 274 when same and post 266 have been applied to magnet 50, and in operation, the post 266 extends upwardly through the narrow portion 312 of this opening.

The magnet device may also include an appropriate form of spring cover or cap 320, which in the form shown is substantially U-shaped in transverse cross-sectional configuration, and is secured in place by an appropriate bolt 322 that extends through the side walls or flanges 324 of the cover or cap 320 and upstanding walls 326 of the bracket 240, with appropriate wing nut 328 or the like being employed to secure these members in their indicated relation.

The vacuum drawing application of cover 264 on magnet element 260 and disc 262 is performed before post 266 is applied thereto so that the opening 265 is available for application of the vacuum to the midportion of the magnet.

In operation, the magnet 50, the lever 282, and its spring 298 are disposed in aproximately the full line position of FIGURE 6 under normal conditions when the customer is pushing his cart about the floor of the shopping center in moving from counter-to-counter. This holds the magnet 50 within the cover 220 and maintains the magnet 50 sufficiently high (about one-half inch) above the level of the floor so that it avoids all normal obstructions.

However, when the shopper moves his cart 40 onto a walkway 10 or 12, the magnetic attraction of the magnet 50 for the slider bed or plate moves the magnet 50 downwardly out of cover 220 and into engagement with the surface 52 of the belt. It will be noted that the magnet 50 defines a relatively wide belt engaging surface 330 that is annular in configuration and equally braced on all sides. This insures that the magnetic attraction of the magnet for the slider bed or plate will provide the frictional hold on the belt surface 52 that is desired by the principles of this invention.

As previously indicated, the suspension system for magnet 50 (which system is indicated at 350 and generally includes spring 298, lever 282, and the members they are connected to) is of the constant force type, meaning that the force applied to magnet 50 resisting movement thereof downwardly (or towards its extended position) is essentially the same at the extended and retracted positions of magnet 50 (compare FIGURES 5 and 6). This is achieved by orienting the spring 298 and lever with respect to magnet 50 and to each other such that the distance between pivot point 291 (of lever 282) and the center line 299 of spring 298 in the retracted position of the device (see arrow A), times the tension force generated by spring 298 (and acting along the center line 200) in tending to draw lever end 292 toward adjustment screw 300 is substantially equal to the distance between the pivot point 291 and the center line 299 of spring 298 when in the extended position of the device (see arrow B) times the corresponding tension force generated by springs 298 when in that position are substantially equal, and such that at the indicated retracted and extended positions of the magnet and for all positions in between, the vertical force acting to support magnet 50 is essentially the same. This is done by proportioning the parts substantially as indicated and disposing the point of support of the magnet 50 on lever 282 so that it is closely adjacent the level of pivot point 291 in any possible operative position of the suspension.

The significance of my constant force suspension lies in the fact that the further the magnet is from a surface or object it is to be attracted to, the more powerful the magnet must be if it is to move toward such surface or object (in this case, belt surface 52), and the springs of the helical or leaf type ordinarily have a rising spring rate (meaning that the more they are deflected from a given position the greater the spring force resisting deflection becomes).

For instance, if magnet 50 were suspended from cover 220 by a helical spring received about post 266 between member 274 and cover 220 (assuming lever 282 is eliminated) magnet 50 would have to be impractically large and powerful if it had to be withdrawn to an elevation of about one-half inch above the floor level and yet be sufficiently attracted to conveyor surface 32 to hold the cart in place when on the walkway. Since the magnet 50 in my device needed a separation from the floor on the order of one-half inch to clear carpeting and other protuberances (in the particular installation to which the embodiment of FIGURES 1-6 has been applied) I devised the indicated constant force suspension 350 for retractably supporting magnet 50, with the result that I can use as a magnet 50 one having magnetic characteristics that otherwise would permit a floor-magnet separation of only about one-eighth of an inch.

Figure 8:
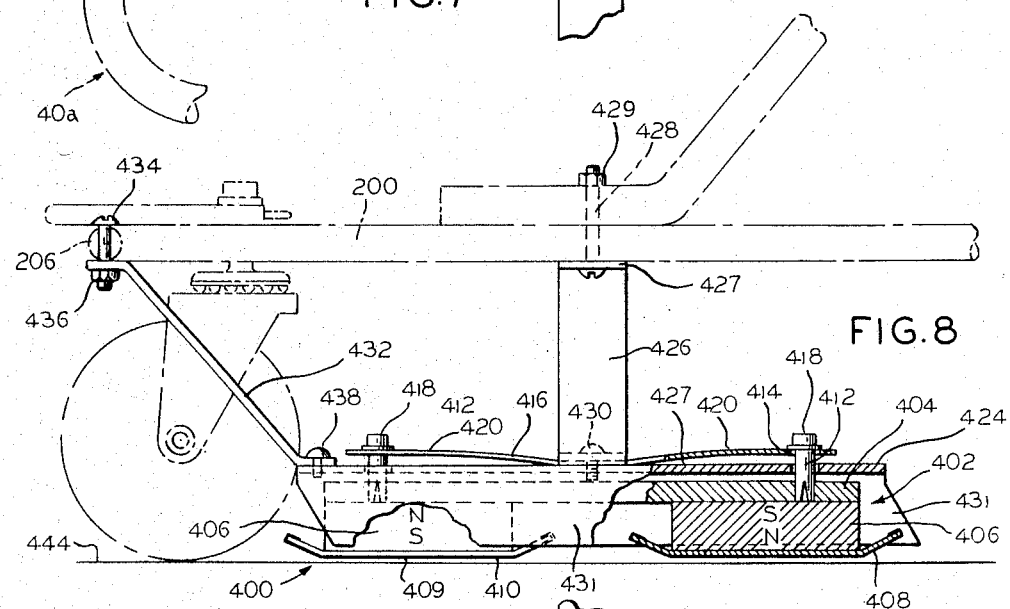
Figure 9:
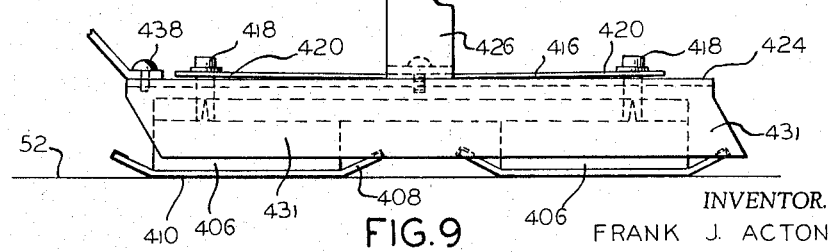

Turning now to the magnet device 400 that is illustrated in the embodiment of FIGURES 7-9, the device 400 comprises a magnet 402 in the form of a bar or plate 404 formed from a suitable magnetic material, such as cold rolled steel, having affixed to either end thereof a magnet body or element 406 that may be formed from the same material specified for magnet 50. The bodies or elements 406 may be affixed to the plate 404 by an appropriate epoxy type adhesive, and each body or element 406 has secured to its downwardly facing surface a shoe element 408 formed from a suitable magnetic material such as cold rolled steel, which shoes are affixed to their respective magnet elements 406 by an appropriate epoxy type adhesive.

Each of the shoes 408 preferably has its undersurface covered by a cloth material 409 which has its outer surface 410 formed to be abrasive in nature to increase the frictional characteristics between the magnet 402 and the surface 52 of the belt.

The magnet plate 404 adjacent each of its ends fixedly carries an upstanding pin 412, with the pins 412 respectively being received through appropriate openings 414 formed in either end 420 of a leaf spring element 416 that is intended to hold the magnet 402 in the retracted position shown in FIGURE 8. Appropriate nuts 418 (which are of the "push on" type in the form illustrated) cooperate with the upstanding ends of the respective pins 412 for the purpose of providing an abutment on each pin against which the leaf spring ends 420 are to bear, it being understood that the spring ends 420 are to be placed under bending stress so as to bias pins 412 upwardly in the showing of FIGURES 8 and 9.

The spring 416 and the associated magnet 402 are supported from the respective carts 40a to which they are applied, in the illustrated arrangement of these figures, by interposing channelshaped magnet cover 424 in between the spring 416 and the magnet 402, and securing the cover 424 to the frame 200 of the cart 40a by affixing transverse brace or support element 426 at its ends 427 to the cart frame member 200, by as employing appropriate bolts 428 and nuts 429, and with the magnet cover having been secured to the brace element 426 by appropriate rivets 430. In addition, the magnet cover 424 is affixed to the forward portion 206 of the cart frame by an appropriate end brace element 432 affixed to the cart frame by appropriate bolt 434 and nut 436, and to the cover by appropriate rivets 438.

Spring element 416 thus has its mid portion 440 received between the transverse brace 426 and the top 427 of magnet cover 424, and as already indicated, the parts should be arranged so that the magnet 402 is held withdrawn within cover 424, in the position shown in FIGURE 8, by the action of the spring ends 420 acting on pins 412. Note that the sides 431 of cover 424 substantially cover the magnet 402 in this position.

The extended position of the magnet 402 is indicated in FIGURE 9, wherein the undersurfaces 410 of the shoes 408 are shown in engagement with the belt surface 52. The floor surface 444 is shown in FIGURE 8 for purposes of comparison with the showing of surface 52 in FIGURE 9, and in a successful tested embodiment of FIGURES 7-9, the surfaces 410 of magnet 402 should be about 1/8 inch above the floor in the retracted position of the device.

This embodiment of the invention does not have the constant force suspension advantage described in connection with the embodiment of FIGURES 4-8, but for installations where the magnet 402 may be positioned closely adjacent the floor in its retracted position, the embodiment of FIGURES 7-9 will be entirely satisfactory for purposes of this invention.

In a commercial embodiment of this invention, in which the magnet device 42 is employed, the conveyors installed as walkways 10 and 12 are 82 feet in length, 30 inches in width, and move at a speed of 80 feet per minute. Each conveyor has a capacity of moving 3600 persons per hour (with carts).

It should be understood that while the application of the illustrated retractable magnet devices to shopping carts is an important aspect of this invention, the principles involved are equally applicable to other wheeled devices used by the public, such as baby carriages, wheelchairs, and the like. Consequently, the term "cart" or "parcel cart" as used in the appended claims is intended to mean all these wheeled structures.

It should also be understood that this invention is fully applicable to passenger belt or equivalent type conveyor apparatus in general, such as that disclosed in Sinden et al. Patent 2,973,04, and regardless of the particular type of belt or conveyor training arrangement employed. Furthermore, the magnetic component of the conveyor may be incorporated in the belt itself, rather than used as a slider bed or plate; for instance, the belt 20 could be in the form of a carcass that includes a ribbon of magnetic material, or the belt 20 might be made from a magnetic material, in which case the slider bed could be formed entirely from non-magnetic materials.

Moreover, the slider bed itself could be arranged to be the magnet component of this invention, in which case the magnets 50 and 402 would take the form of magnetic materials having the same configurations and arrangements indicated. However, the application of the magnets to the carts is preferred because of the obvious simplicity involved.

It will therefore be seen that I have provided an inclined walkway arrangement that for the first time makes it completely safe and practical to use shopping carts in multi-level shopping centers and the like.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. Moving walkway apparatus for conveying passengers and their wheeled parcel carts between floor levels that are at different elevations, said apparatus comprising:
   a conveyor including an endless member mounted to present an inclined transport surface that extends between said levels,
   means for moving said member in a forward direction,
   and means for magnetically coupling the individual carts to the transport surface for movement with said member, said coupling means comprising:
   a magnetic component forming a part of said conveyor and extending longitudinally of said surface and substantially the length thereof,
   and a magnetic component carried by the individual carts and positioned for magnetic attraction to said conveyor component when said cart component is brought into proximity with said conveyor component,
   one of said components having the characteristics of a magnet of sufficient strength to cause the individual carts when moved onto said surface to remain fixed with respect to said surface against the action of gravity as the individual carts are conveyed by said surface.

2. Moving walkway apparatus for conveying a passenger and his parcels between floor levels that are at different elevations, said apparatus comprising:
   a conveyor including an endless member mounted to present an inclined transport surface that extends between said levels,
   a wheeled parcel cart adapted to carry the passenger's parcels,
   means for moving said endless member in a forward direction,
   and means for magnetically coupling said cart to the transport surface for movement with said member, said coupling means comprising:
   a magnetic component forming a part of said conveyor and extending longitudinally of said surface and substantially the length thereof,
   and a magnetic component carried by said cart and positioned for magnetic attraction to said conveyor component when the said cart component is brought into proximity with said conveyor component,
   one of said components having the characteristics of a magnet of sufficient strength to cause said cart when moved onto said surface to remain fixed with respect to said surface against the action of gravity as said cart is conveyed by said surface.

3. Moving walkway apparatus for conveying a passenger and his parcels between floor levels that are at different elevations, said apparatus comprising:
   a conveyor including an endless member mounted to present an inclined transport surface that extends between said levels,
   a plurality of wheeled parcel carts each adapted to carry parcels and be conveyed by said conveyor,
   means for moving said endless member in a forward direction,
   and means for magnetically coupling the individual carts when on the conveyor to said transport surface for movement with said member, said coupling means comprising:
   a magnetic component forming a part of said conveyor and extending longitudinally of said surface and substantially the length thereof,
   and a magnetic component carried by each of the individual carts and positioned for magnetic attraction to said conveyor component when the individual carts are brought into proximity with said conveyor component,
   one of said components having the characteristics of a magnet of sufficient strength to cause the individual carts when moved onto said surface to remain fixed with respect to said surface against the action of gravity as the individual carts are conveyed by said surface.

4. Moving walkway apparatus for conveying a passenger and his parcels between floor levels that are at different elevations, said apparatus comprising:
   a conveyor comprising an endless member trained over end pulleys and a slider bed structure formed to provide an inclined conveyor portion that extends between said levels and that defines an inclined transport surface,
   said slider bed structure being coextensive with said inclined conveyor portion and being formed from a magnetic material,
   and a plurality of wheeled parcel carts each adapted to carry parcels and be conveyed by said conveyor,
   each of said carts carrying a magnet device positioned for magnetic attraction to said slider bed structure when the individual carts are brought into proximity with said slider bed structure,
   said magnet devices including a magnet of sufficient magnetic strength to cause the individual carts when moved over said slider bed structure to remain affixed with respect to said surface against the action of gravity as the individual carts are conveyed by said conveyor over said inclined conveyor portion.

5. Moving walkway apparatus for conveying a passenger and his parcels between floor levels that are at different elevations, said apparatus comprising:
   (a) a conveyor comprising an endless member trained over end pulleys and a slider bed structure formed to provide an inclined conveyor portion that extends between said levels and that defines an inclined transport surface,
   (b) said slider bed structure being coextensive with said inclined conveyor portion and being formed from a magnetic material,
   (c) and a plurality of wheeled parcel carts each adapted to carry parcels and be conveyed by said conveyor,
   (d) each of said carts carrying adjacent the wheel level of the cart a magnet device, said magnet device comprising:
(1) a magnet,
(2) a carrier assembly supporting said magnet and including means for mounting said magnet for movement between an extended operative position in contact with said surface and a retracted inoperative position above the supporting surface engaging portions of the cart wheels,
(3) said magnet being of sufficient magnetic strength to bring the magnet of the individual carts into engagement with said surface, when the individual carts are applied to the conveyor and moved over said slider bed structure, and hold the individual carts affixed with respect to said surface against the action of gravity as the individual carts are conveyed by said conveyor over said inclined conveyor portion.

6. The apparatus set forth in claim 5 wherein said magnet device carrier assembly comprises
a magnet cover member having an open bottom,
said magnet being pendently mounted within said cover member,
and means for resiliently biasing said magnet to its retracted inoperative position within said cover member,
said biasing means having its strength proportioned to the magnetic strength of said magnet to permit said magnet of the respective carts to be moved against the action of said biasing means and into said engagement with said surface when the respective magnets are disposed over said slider bed structure.

7. The apparatus set forth in claim 6 wherein said magnet comprises
an annular member formed from a ferrite ceramic material,
and a cover element vacuum drawn over the surface of said magnet that is to engage said transport surface.

8. The apparatus set forth in claim 5 wherein said magnet device carrier assembly comprises:
a plate member resiliently supported adjacent its ends by the individual carts, respectively, and disposed generally parallel to the plane of the cart wheels;
and wherein said magnet comprises a magnet portion applied to each of the opposite ends of said plate member.

9. The apparatus set forth in claim 6 wherein said magnet biasing means further comprises:
means for applying to said magnet a bias tending to move said magnet to its inoperative position that acts with substantially constant force in all positions of said magnet between said extended and retracted positions.

10. The apparatus set forth in claim 5 wherein
(e) said conveyor is formed to define a generally horizontal upper terminal end portion,
(f) and a curved portion merging smoothly into said inclined portion from said end portion thereof.

11. The apparatus set forth in claim 10 wherein:
(g) said conveyor endless member is formed to define a load supporting surface having a multitude of grooves extending longitudinally thereof,
(h) and wherein stationary loading and unloading platforms are positioned at either end of said conveyor including comb members in sliding cooperation with said conveyor load supporting surface.

12. The apparatus set forth in claim 5 including:
(e) a second conveyor arranged as defined in subparagraphs (a) and (b),
(f) said conveyors being positioned adjacent each other and extending between like levels,
(g) and means for moving the respective conveyor endless members in opposite directions.

13. In a parcel cart for use on the transport surface of an inclined moving passenger conveyor of the type including a magnet structure that is substantially coextensive with its transport surface, said cart comprising:
a frame carrying a parcel receiving basket,
wheels journalled on said frame for supporting same,
and a magnetic device carried by the frame adjacent the level of said wheels, said magnetic device comprising:
a magnet,
a carrier assembly supporting said magnet and including means for mounting said magnet for movement between an extended operative position in contact with said surface and a retracted inoperative position above the supporting surface engaging portions of the cart wheels,
said magnet being of sufficient magnetic strength to bring said magnet into engagement with said surface, when said cart is applied thereto, and hold the cart affixed to said surface against the action of gravity as said cart is conveyed by said conveyor.

14. The cart set forth in claim 13 wherein said magnetic device carrier assembly comprises:
a magnet cover member having an open bottom,
said magnet being pendantly mounted within said cover member,
and means for resiliently biasing said magnet to its retracted inoperative position within said cover member,
said biasing means being of the substantially constant force type and having its strength proportioned to the magnetic strength of said magnet to permit said magnet to be moved against the action of said biasing means and into engagement with said surface when said magnet is disposed in proximity to said surface.

15. The cart set forth in claim 13 wherein said magnet device carrier assembly comprises
a plate member resiliently supported by said frame and disposed generally parallel to the plane of said wheels,
and wherein said magnet comprises a magnet portion applied to each of the opposite ends of said plate member.

16. The method of conveying shoppers and their parcel carts between different floor levels of a shopping center or the like, which method includes:
maintaining an inclined moving walkway between the adjacent floor levels,
and when the shopper and his cart enters onto the walkway for conveyance from one of the floor levels to the other level, releasably securing the parcel cart to the walkway against the action of gravity,
conveying the shopper and his cart on the walkway to the other level while maintaining the cart secure to the walkway,
and releasing the cart from the walkway as the cart and shopper are discharged therefrom at said other level.

17. In a magnet device for application to parcel carts for suspending a magnet at the wheel level of the cart, said device comprising
a magnet,
a carrier assembly resiliently supporting said magnet and including means for mounting said magnet for movement between an extended position in contact with a cart wheel supporting surface and a retracted position above the supporting surface engaging portions of the cart wheels,
said magnet being of sufficient strength to move said magnet to its extended position when the cart wheel supporting surface comprises magnetic material.

18. The magnet device set forth in claim 17 wherein said carrier assembly comprises a lever pendantly supporting said magnet,
said lever being fulcrumed at one end thereof,
and a helical spring having one end secured to the other end of said lever,
said spring extending substantially lengthwise of said lever,
and an adjustable support positioned over said one of said lever with the other end of said spring being secured to said support,
said fulcrumed end of said lever, the portion of same engaging said magnet to support the latter,
and said one end of said spring being positioned for operation in substantial horizontal alignment,
said carrier assembly thereby comprising a substantially constant force magnet suspension device.

19. The magnet device set forth in claim 17 wherein said carrier assembly comprises:
a plate member,
and leaf spring means for resiliently supporting said plate member in a substantially horizontal position, said magnet being affixed to said plate member.

20. In moving walkway apparatus for conveying passengers and their parcel carts between different floor levels, the improvement comprising:
a conveyor including an endless member mounted to present an inclined passenger transport surface that extends between said levels,
means for moving said member in a forward direction,
a plurality of parcel carts for use by the passengers on the different floor levels,
and means for releasably coupling the individual carts to the transport surface for movement with said member between said levels regardless of whether the forward end of the carts when on the transport surface is inclined upwardly or downwardly,
said releasable coupling means comprising:
a brake member carried by the individual carts and positioned to be disposed in juxtaposition with said transport surface when the individual carts are brought onto said conveyor,
and means for bringing said brake member into sufficient frictional engagement with said transport surface to cause the individual carts when moved onto said surface to remain fixed with respect to said surface against the action of gravity as the individual carts are conveyed by said surface.

References Cited by the Examiner

UNITED STATES PATENTS

| | | | |
|---|---|---|---|
| 2,791,291 | 5/1957 | Grondona | 186—1 |
| 3,044,577 | 7/1962 | Lotz | 188—5 |
| 3,146,872 | 9/1964 | Prucha | 198—16 |

EVON C. BLUNK, *Primary Examiner.*

A. C. HODGSON, *Assistant Examiner.*